United States Patent [19]
Pope

[11] Patent Number: 4,748,666
[45] Date of Patent: May 31, 1988

[54] ECHO CANCELLING SYSTEM

[75] Inventor: David J. Pope, East Kew, Australia

[73] Assignee: EMI Limited, Hayes, England

[21] Appl. No.: 736,671

[22] Filed: May 22, 1985

[30] Foreign Application Priority Data

May 22, 1984 [GB] United Kingdom ............... 8413091

[51] Int. Cl.$^4$ .............................................. H04B 3/22
[52] U.S. Cl. ..................................... 379/410; 379/406
[58] Field of Search ............ 179/18 BC, 170.2, 170.6, 179/170.8; 379/406, 407, 410, 411; 370/32.1, 32; 333/18, 28 R

[56] References Cited

U.S. PATENT DOCUMENTS

| | | | |
|---|---|---|---|
| 3,499,999 | 3/1970 | Sondhi | 379/411 X |
| 3,500,000 | 3/1970 | Kelly, Jr. et al. | 379/410 |
| 4,028,496 | 6/1977 | LaMarche et al. | 379/406 X |
| 4,126,766 | 11/1978 | McLaughlin et al. | 370/62 |
| 4,300,231 | 11/1981 | Moffitt | 370/86 |
| 4,303,895 | 12/1981 | Ohnishi et al. | 333/18 |
| 4,347,615 | 8/1982 | Ash | 375/14 |
| 4,363,938 | 12/1982 | Daaboul et al. | 379/24 |
| 4,609,788 | 9/1986 | Miller et al. | 370/32.1 |

FOREIGN PATENT DOCUMENTS 0042446 12/1981 European Pat. Off. .

Primary Examiner—Jin F. Ng
Assistant Examiner—R. Vaas
Attorney, Agent, or Firm—Fleit, Jacobson, Cohn & Price

[57] ABSTRACT

An echo cancelling system incorporated in a conventional echo canceller with additional circuitry to provide tracking and compensation for drifting of any D.C. offset generated.

Upon initial energization of the system (i.e. before data signals are processed thereby) an output signal $e_{1k}$ from an error signal input device represents a D.C. offset value generated by the components of the system.

This value is stored in a D.C. offset register, the loading of which is controlled by a load/inhibit signal. Refining of the stored value during data processing is achieved using predetermined increments $\Delta_1$ for half-duplex mode and $\Delta_2$ (of smaller size) for full-duplex mode.

4 Claims, 1 Drawing Sheet

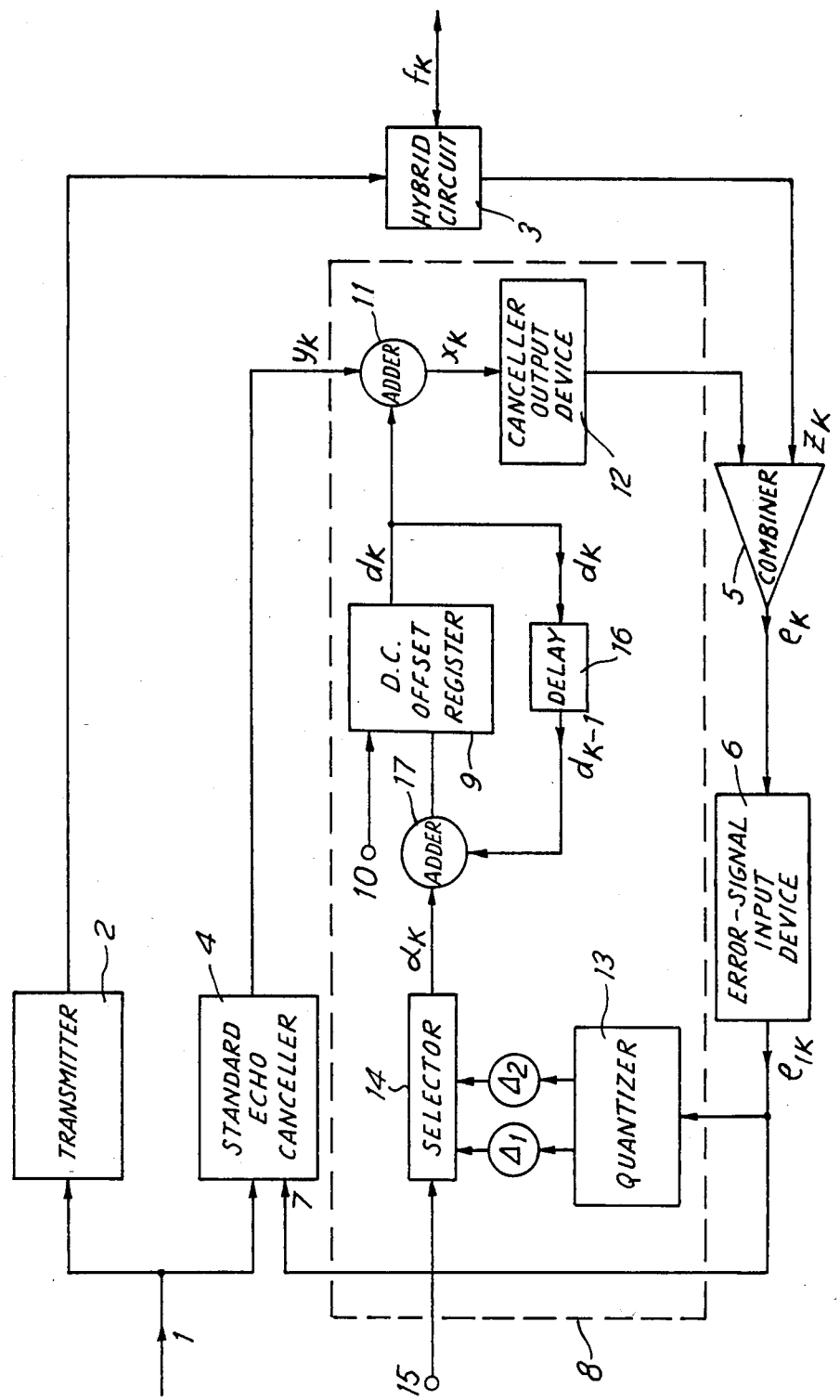

ECHO CANCELLING SYSTEM

This invention relates to an echo cancelling system suitable for use on duplex data transmission systems.

Echo cancelling systems of this type are known, but they may however suffer from the problem of D.C. offsets caused by components within the system, which may result in insufficient echo cancellation.

One method of overcoming this problem is described in European patent application No. 0042446, wherein the polarity of an input signal to an equalizer or echo canceller is periodically inverted and, whilst a required component of an input signal is re-inverted synchronously with the first inversion, the D.C. offset component of the signal remains inverted (since this was generated subsequently to the first inversion), so that the required component is restored to its original polarity and the D.C. offset component is rendered alternately polarised and can therefore be eliminated by integration.

It is an object of the present invention to provide an alternative technique for tracking and substantially compensating for D.C. offsets generated in an echo cancelling system.

According to the present invention, there is provided an echo-cancellation system comprising:

echo-cancelling means to provide an echo-cancelling signal appropriate to a signal input to the echo-cancelling means;

means to produce an error signal from the output of the echo-cancelling means;

means to pass the output of the error-production means to an input of the echo-cancelling means;

compensation means to derive a d.c. offset signal for the echo-cancelling means, the compensation means having means to apply a d.c. offset value for application to the output of the echo-cancelling means, means to produce an initial d.c. offset value in respect to the echo-cancelling means when no signal is input thereto, storage means for holding at least one d.c. offset value for passage to the application means, means for updating, at time intervals during operation of the system, the d.c. offset value for passage to the application means, the up-dating means having means to combine a predetermined increment or decrement with a d.c. offset value in the storage means in accordance with an output of the error-production means.

According to another aspect of the present invention, there is provided a method of echo-cancellation processing of signals, the method comprising:

passing the signals through a first echo-cancelling stage to provide an appropriate echo-cancelling signal;

producing an error signal from the output of the first echo-cancelling stage;

passing the error signal to the first echo-cancelling stage for use therein;

deriving a d.c. offset signal for application to the output of the first echo-cancelling stage, including producing an initial d.c. offset value in respect of the first echo-cancelling stage when no signal is input thereto, holding at least one d.c. offset value for use in application to the output of the first echo-signalling stage, updating, at time intervals during operation of the method, the d.c. offset value for use in the application stage, the updating step including combining a predetermined increment or decrement with a d.c. offset value in the storage means in accordance with the error signal produced.

A relatively coarse refinement of this stored value is produced, in a half-duplex mode of the system, by adding a first predetermined increment or decrement to the stored value, in dependence on the previously generated D.C. offset-compensated signal.

A substantially finer adjustment is then produced, in a full-duplex mode of the system, wherein a second predetermined increment or decrement, which is substantially smaller in magnitude than the first, is added, relatively more frequently than in the half-duplex mode, to the stored value.

In addition to the adjustment of the stored value of the D.C. offset, the arrangement is capable of tracking and substantially compensating for drifting of the D.C. offset of the components of the system due to temperature variation.

The invention will now be further described by way of example only with reference to the accompanying drawing, the single FIGURE of which shows one embodiment of the present invention.

Referring now to the FIGURE, an input signal 1 is fed to a transmitter 2, from which it is transmitted to a hybrid circuit 3 and also to an echo canceller 4. An echo canceller output signal $y_k$, where k represents the kth data element of the signal, is passed to a combiner 5, wherein it is compared with an echo signal $Z_k$ from the hybrid circuit 3, so as to generate an error signal $e_k$, this being the difference between the echo canceller output signal and the echo signal. The error signal is then circulated, via an error signal input device 6, to an input 7 of the echo canceller 4.

However, the components of the echo cancelling system tend to generate a D.C. offset, which can cause insufficient echo cancellation, thereby rendering it desirable to compensate substantially for any D.C. offset so generated.

To this end, the present invention provides an arrangement 8, which operates in parallel with the echo cancelling system.

Upon initial energisation of the system (i.e. before data signals are processed thereby) an output signal $e_{1k}$ from the error signal input device 6 represents a D.C. offset value generated by the components of the system.

This value is stored in a D.C. offset register 9, the loading of which is controlled by a load-inhibit signal 10. The accuracy of this stored D.C. offset value is however limited by the error signal input device 6 and it is therefore necessary to refine the stored value during data processing. This is achieved on the basis of predetermined increments and the load/inhibit control signal 10 prevents any further direct loading into the register 9 once the initial loading has been achieved.

In a half-duplex mode of the system, echo canceller input signal 1 varies, whilst signal $f_k$, in association with the hybrid circuit 3, remains zero. The echo canceller 4 therefore generates a finite canceller output signal $y_k$. The input signal 1 is simultaneously applied to the transmitter 2 and therefore to the hybrid circuit 3, so that a finite echo signal $Z_k$ is generated. Consequently, error signals $e_k$ and $e_{1k}$ become finite.

Output signal $d_k$ from the register 9 is then added, at 11, to the canceller output signal $y_k$ to produce a signal $x_k$, which is fed to a canceller output device 12 and then to the combiner 5, wherein it is compared with the echo signal $Z_k$, so as to generate an error signal $e_k$. The error signal $e_k$ is then fed to the error signal input device 6 and output $e_{1k}$ therefrom is fed to input 7 of the echo canceller 4 and to a quantizer 13.

Predetermined increments or decrements, $\Delta_1$, and $\Delta_2$, wherein the magnitude of $\Delta_2$ is substantially less than that of $\Delta_1$, are provided and one of these is selected by a selector 14. Both increments or decrements, $\Delta_1$, and $\Delta_2$, are independent of any parameters used by the echo cancelling system and their magnitudes are chosen to minimise tracking and over-compensation of the D.C. offset.

The quantizer 13 operates in accordance with a step function having a step-size of $\pm 1$, in dependence on the magnitude of the error signal $e_{1k}$, so as to derive the polarity of the increment $\Delta_1$, or $\Delta_2$. The quantizer 13 is also capable, in accordance with the step function, of producing a zero output, which aids statistical properties of algorithms used to operate the system.

In the half-duplex mode, the increment $\Delta_1$, is selected by the selector 14, which also has an input 15 from an adjustment step-size control. Selector output $\alpha_k$ may therefore be equal to $\pm\Delta_1$, or 0 in this mode.

Output $d_k$ from the D.C. register 9 is passed to a delay 16 of one sample time, so that a signal $d_{k-1}$ is produced to which the selector output $\alpha_k$ is added at 17, and the combination of signals $\alpha_k$ and $d_{k-1}$ is stored as an updated value of the D.C. offset in register 9.

The register output signal $d_k$ now represents the updated value of the D.C. offset, which is then added to the canceller output signal $y_k$, at 11, to produce a D.C. offset-compensated signal $x_k$, and the above cycle of operations consequently re-commences.

It can therefore be seen that, as the magnitude of the error signal $e_{1k}$ varies, the quantizer will derive an increment of $\pm\Delta_1$, or 0 in dependence on that magnitude, so as to compensate substantially for the fluctuations in the D.C. offset of the components.

The arrangement is therefore capable of tracking these fluctuations, which may be due to temperature variations, and to compensate therefor, as well as continuously refining the initial registered value of the D.C. offset.

In a full-duplex mode, signal $f_k$ is finite, so that the error signal $e_{1k}$ is also finite substantially all of the time. The quantizer 13 will therefore rarely produce a zero output, thereby enabling more frequent up-dating of the stored value of the D.C. offset in the register 9. In the full-duplex mode, selector 14 is set to provide an increment of $\pm\Delta_2$, the magnitude of which is substantially less than that of $\Delta_1$, in the half-duplex mode.

The stored value in the full-duplex mode is therefore more frequently updated with relatively smaller increments or decrements, thereby providing a relatively finer adjustment of the stored D.C. offset value than in the half-duplex mode.

The arrangement incorporated in the echo cancelling system, in accordance with the present invention, may be typically implemented by a pre-settable up-down counter, with the increment/decrement selector injecting a count pulse at an appropriate stage of the counter, for example.

The addition of signals at 11 could be implemented by a pre-set feature of an accumulator of the echo canceller, which is controlled by the stored value in the register 9.

Furthermore, the present invention can be employed in any echo cancelling system.

What is claimed is:

1. An echo-cancellation system comprising:
   echo-cancelling means to provide an echo-cancelling signal for a signal input to the echo-cancelling means;
   means to produce an error signal from an output of the echo-cancelling means;
   means to pass the error signal output from the error-production means to an input of the echo-cancelling means; and
   compensation means to derive a d.c. offset signal for the echo-cancelling means, the compensation means having means to apply a d.c. offset value for application to the output of the echo-cancelling means, means to produce an initial d.c. offset value when no signal is input to the echo-cancelling means, storage means for holding at least one d.c. offset value for passage to the application means, means for updating, at time intervals during operation of the system, the d.c. offset value for passage to the application means, the up-dating means having means to combine a predetermined increment or decrement with a d.c. offset value in the storage means in accordance with a signal output of the error-production means.

2. A system according to claim 1, wherein the compensation means has an up-dating means which is selectively operable in association with a plurality of values of predetermined increments/decrements, each said value of predetermined increment/decrement being suited to a particular mode of operation of the system.

3. A system according to claim 1, wherein the compensation means has an up-dating means which is selectively operable at a number of different rates.

4. A method of echo-cancellation processing of signals, the method comprising:
   passing the signals through a first echo-cancelling stage to produce an echo-cancelling signal;
   producing an error-signal from the echo-cancelling signal output from the first echo-cancelling stage;
   passing the error signal to the first echo-cancelling stage for use therein; and
   deriving a d.c. offset signal for application to the output of the first echo-cancelling stage, including producing a d.c. offset value in respect of the first echo-cancelling stage when no signal is input thereto, holding at least one d.c. offset value for use in application to the output of the first echo-cancelling stage, updating, at time intervals during operation of the method, the d.c. offset value for use in the application stage, the updating step including combining a predetermined increment or decrement with a d.c. offset value in the storage means in accordance with the error signal produced.

* * * * *